(12) United States Patent
Hotta et al.

(10) Patent No.: US 8,275,222 B2
(45) Date of Patent: Sep. 25, 2012

(54) HANDWRITING DETECTION SHEET AND HANDWRITING SYSTEM

(75) Inventors: Hiroyuki Hotta, Kanagawa (JP); Naoki Hayashi, Kanagawa (JP); Yoshitsugu Hirose, Kanagawa (JP); Minoru Koshimizu, Kanagawa (JP); Tsutomu Ishii, Kanagawa (JP); Shigehiko Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1038 days.

(21) Appl. No.: 11/715,360

(22) Filed: Mar. 8, 2007

(65) Prior Publication Data
US 2008/0019616 A1 Jan. 24, 2008

(30) Foreign Application Priority Data

Jul. 13, 2006 (JP) .................................. 2006-192947

(51) Int. Cl.
*G06K 9/18* (2006.01)
*G06K 9/00* (2006.01)
*G06K 9/46* (2006.01)
*G06K 7/10* (2006.01)
*G06F 3/033* (2006.01)
*G09G 5/00* (2006.01)

(52) U.S. Cl. ........ 382/313; 382/100; 382/190; 382/186; 382/187; 382/188; 345/179; 345/156; 235/462.01

(58) Field of Classification Search .................. 382/313, 382/187
See application file for complete search history.

(56) References Cited

U.S. PATENT DOCUMENTS

| 4,420,682 | A | * | 12/1983 | Huber ...................... 235/472.01 |
| 4,731,526 | A | * | 3/1988 | Knoll et al. ............... 235/472.01 |
| 4,813,077 | A | * | 3/1989 | Woods et al. ................. 382/138 |
| 5,661,506 | A | * | 8/1997 | Lazzouni et al. ............. 345/179 |
| 6,118,889 | A | * | 9/2000 | Izuno et al. .................... 382/119 |
| 6,418,279 | B1 | * | 7/2002 | Weinberger et al. ............. 399/2 |
| 6,585,341 | B1 | * | 7/2003 | Walker et al. .................... 347/14 |
| 6,651,894 | B2 | * | 11/2003 | Nimura et al. ................. 235/494 |
| 7,202,861 | B2 | * | 4/2007 | Lynggaard .................... 345/179 |
| 7,441,183 | B2 | * | 10/2008 | Burstrom et al. ............. 715/230 |
| 7,639,876 | B2 | * | 12/2009 | Clary et al. ................... 382/186 |

(Continued)

FOREIGN PATENT DOCUMENTS
JP A 2003-255919 9/2003

(Continued)

OTHER PUBLICATIONS

U.S. Appl. No. 11/442,307, Kengo Shinozaki, filed May 30, 2006.

*Primary Examiner* — Michelle Entezari
(74) *Attorney, Agent, or Firm* — Oliff & Berridge, PLC (57) ABSTRACT

A handwriting detection sheet includes a handwriting layer, a code layer and an optical layer. The handwriting layer can display handwriting. The code layer is placed on a rear-face side of the handwriting layer. The code layer includes plural code images arranged in a matrix manner. In the code images, position codes are encoded with a light absorption material that absorbs infrared light. The optical layer is placed on a rear-face side of the code layer. The optical layer reflects infrared light and allows visible light to pass through.

20 Claims, 7 Drawing Sheets

U.S. PATENT DOCUMENTS

| | | | |
|---|---|---|---|
| 7,672,513 B2* | 3/2010 | Bjorklund et al. | 382/188 |
| 2002/0020750 A1* | 2/2002 | Dymetman et al. | 235/472.01 |
| 2003/0132302 A1* | 7/2003 | Hattori | 235/492 |
| 2003/0160095 A1* | 8/2003 | Segal | 235/375 |
| 2003/0234294 A1* | 12/2003 | Uchihiro et al. | 235/492 |
| 2004/0035935 A1* | 2/2004 | Takahashi et al. | 235/462.09 |
| 2004/0074350 A1* | 4/2004 | Hanada | 82/1.11 |
| 2005/0184159 A1* | 8/2005 | Hattori et al. | 235/462.45 |
| 2006/0007255 A1* | 1/2006 | Chen | 347/15 |
| 2006/0091304 A1* | 5/2006 | Saint Clair | 250/231.13 |
| 2006/0280331 A1* | 12/2006 | Chosson et al. | 382/100 |
| 2007/0057060 A1* | 3/2007 | Hasuike | 235/454 |
| 2007/0231587 A1* | 10/2007 | Naito et al. | 428/457 |
| 2007/0276694 A1* | 11/2007 | Moriyama | 705/2 |

FOREIGN PATENT DOCUMENTS

| | | |
|---|---|---|
| JP | A 2004-139534 | 5/2004 |
| JP | A 2005-56073 | 3/2005 |

* cited by examiner

Y COORDINATE CODE

X COORDINATE CODE

IDENTIFICATION CODE

HANDWRITING DETECTION SHEET AND HANDWRITING SYSTEM

CROSS-REFERENCE TO RELATED APPLICATIONS

This application is based on and claims priority under 35 U.S.C. §119 from Japanese Patent Application No. 2006-192947 filed Jul. 13, 2006.

BACKGROUND

Technical Field

This invention relates to a handwriting detection sheet capable of displaying by means of an electronic paper or a manuscript paper, handwriting with an electronic pen and acquiring handwriting data, and relates to a handwriting system using the handwriting detection sheet.

SUMMARY

According to an aspect of the invention, a handwriting detection sheet includes: a handwriting layer that can display handwriting; a code layer placed on a rear-face side of the handwriting layer, the code layer comprising a plurality of code images arranged in a matrix manner, wherein in the code images, position codes are encoded with a light absorption material that absorbs infrared light; and an optical layer placed on a rear-face side of the code layer, the optical layer that reflects infrared light and allows visible light to pass through.

BRIEF DESCRIPTION OF THE DRAWINGS

Exemplary embodiments of the invention will be described in detailed with reference to the accompanying drawings wherein.

DETAILED DESCRIPTION (General Configuration of System)

Figure 1:
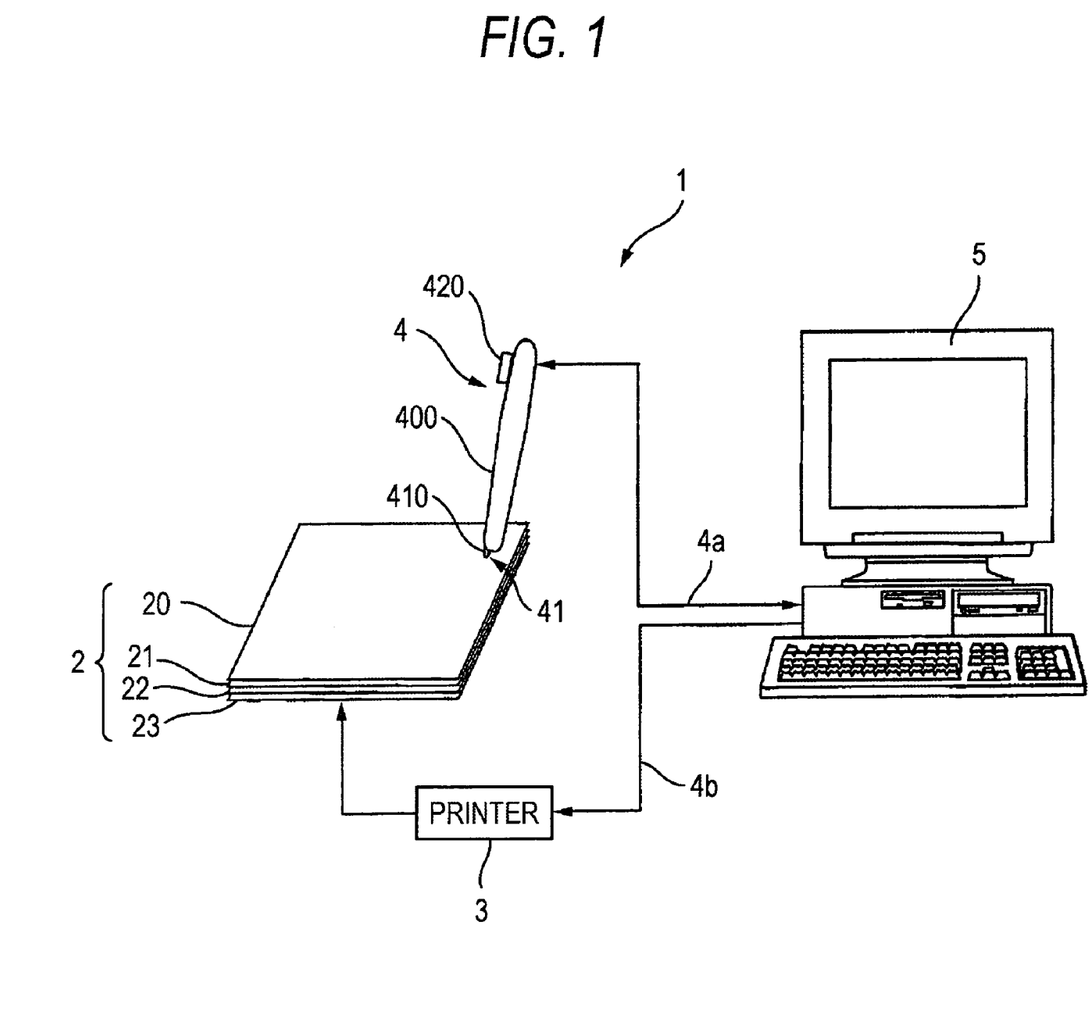
FIG. 1 is a drawing showing an outline of a handwriting system according to an exemplary embodiment of the invention.

FIG. 1 shows a handwriting system 1 according to an exemplary embodiment of the invention. The handwriting system 1 includes a handwriting detection sheet 2 for detecting handwriting, a printer 3 for rewriting a display image on electronic paper, which forms the handwriting detection sheet 2, an electronic pen 4 for enabling a user to handwrite an image and/or a character on the handwriting detection sheet 2, and an information processing apparatus 5 for acquiring and processing handwriting data through a cable 4a from the electronic pen 4 and controlling the printer 3 through a cable 4b.

(Handwriting Detection Sheet)

The handwriting detection sheet 2 has such a structure that a handwriting layer 20, a code layer 21, an optical layer 22 and electronic paper 23 are stacked in order from the top layer to the bottom layer. For example, in the handwriting detection sheet 2, the handwriting layer 20, the code layer 21 and the optical layer 22 may be integrated and the electronic paper 23 may be detachable or may adopt a book form. The form of the handwriting detection sheet 2 is not limited.

The handwriting layer 20 also serves as a protective layer. An image and a character can be written onto the handwriting layer 20 with ink supplied from a pen point 410 of the electronic pen 3. The written ink is erasable by an erasing member 420 of the electronic pen 3. The handwriting layer 20 is formed of a transparent or translucent resin material for allowing visible light and infrared light to pass through, for example, a polyethylene terephthalate (PET) film.

The code layer 21 has (i) a pattern portion formed of a light absorption material for absorbing infrared light (described later in detail) and (ii) other portions than the pattern portion, formed of a resin material for allowing infrared light and visible light to pass through, for example, a polyethylene terephthalate (PET) film.

The optical layer 22 is formed of a resin material for allowing visible light to pass through and reflecting infrared light, for example, a resin material such as a PET film to which infrared reflection coating is applied with a dielectric multi-layer film (hot mirror of Edmond Optics Japan, HIR series of Harrison Toshiba Lighting Company).

(Electronic Paper)

The electronic paper 23 may have a roughly thin-type rectangular shape and have a memory property for retaining a display image with no power supply. However, it should be noted that the electronic paper 23 may have no memory property. Also, the electronic paper 23 may be of a self-rewrite type having an image rewrite function. However, it should be noted that the electronic paper 23 may of a rewrite system by means of a printer. Also, the electronic paper 23 may be of a reflection type for reflecting outside light (visible light) to display an image or may be of a light emission type for emitting light to display an image.

The reflection type includes an optical-writing-type electronic paper, a thermosensitive recording medium using leuco dye, and display recording media such as an electrophoresis system for moving charged particles for switching display, a particle rotation system for rotating charged particles for switching display, and a magnetophoresis system for moving particles by magnetism for switching display.

The light emission type includes an LCD (liquid crystal display) using a liquid crystal of ferroelectric liquid crystal having a memory property or a nematic liquid crystal having no memory property; an ELD (electroluminescent display); a PDP (plasma display); a VFD (vacuum fluorescent display); an LED (light emitting diode) display; and an FED (field emission display).

In the exemplary embodiment, the electronic paper 23 uses the optical-writing type electronic paper. The optical-writing type electronic paper includes: a liquid crystal layer having a reflectivity (transmittance), which changes in accordance with an applied voltage between a pair of electrodes; and a photoconductive layer whose resistance value decreases as light is applied thereto. The liquid crystal layer has microcapsules filled with cholesteric liquid crystal, for example. The photoconductive layer includes a charge transport layer and a pair of charge generation layers deposited on both sides of the charge transport layer. Accordingly, it is made possible to apply an AC voltage to the liquid crystal layer so that degradation of the liquid crystal layer can be suppressed and the drive voltage can be made lower and a long life of electronic paper can be accomplished.

(Printer)

The printer 3 applies a drive voltage required for rewriting a display image on the electronic paper 23 to the electronic paper 23. If the electronic paper 23 is an optical-writing type electronic paper, the printer 3 applies a drive voltage to the electronic paper 23 while applying image light to the electronic paper 23 in accordance with image data. If the electronic paper 23 is a self-rewriting type electronic paper, the printer 3 is not required and the information processing apparatus 5 and the electronic paper 23 are connected so as to directly communicate with each other.

(Electronic Pen)

The electronic pen 4 includes a casing body 400 having an outer shape almost similar to that of a general pen and a handwriting pen part 41 housed in the casing body 400 so that the pen point 410 is exposed from the tip of the casing body 400. The electronic pen 4 has a function of capturing a code image of the handwriting detection sheet 2, a function of reading a code from the code image, a function of acquiring handwriting data of the pen point 410, and a function of communicating the read code from the code image. These functions of the electronic pen 4 are described in detail later.

The pen part 41 has the pen point 410 at its tip. The pen part 41 also includes at its rear an ink tank and a writing pressure detection section 411 (described later) for detecting writing pressure given to the pen point 410. Ink may include an ink material, which is writable into the handwriting layer 20, which is erasable with using the erasing member 420, which reflects visible light and which allows infrared light to pass through. For example, B type manufactured by Tokai Optical Co., Ltd. may be used as ink (Information Processing Apparatus)

The information processing apparatus 5 includes a CPU for controlling the whole apparatus 5; a storage section, such as ROM, RAM and/or a hard disk, for storing application programs of the CPU and various data such as image data displayed on the electronic paper 23; an input device such as a keyboard and a mouse; a network interface connected to a network; a display section, such as an LCD (liquid crystal display), for displaying a screen; and an audio output section having a loudspeaker for outputting sound. The information processing apparatus 5 can be implemented as a personal computer, but may be implemented as a personal digital assistant (PDA) or a mobile telephone.

(Image on Code Layer)

Figure 2A:
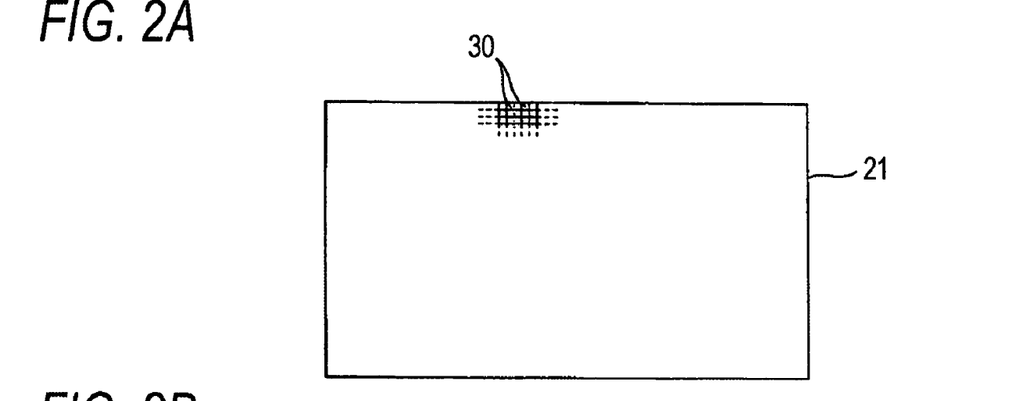
FIG. 2A is a plan view of a code layer of a handwriting detection sheet.
Figure 2B:
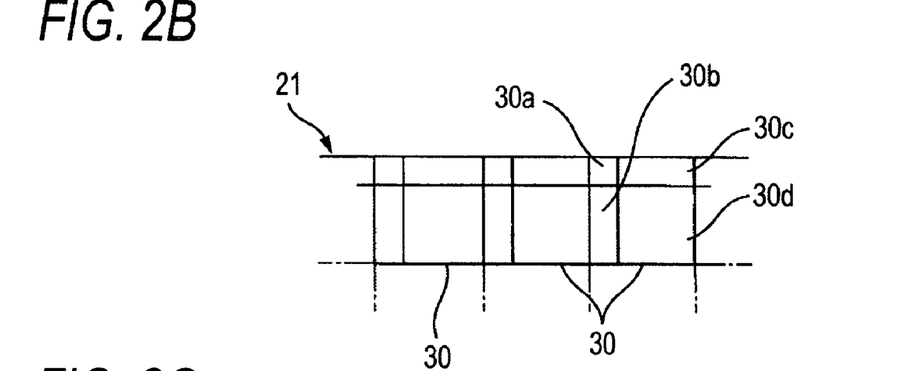
FIG. 2B is a drawing showing the general configuration of a code image.
Figure 2C:
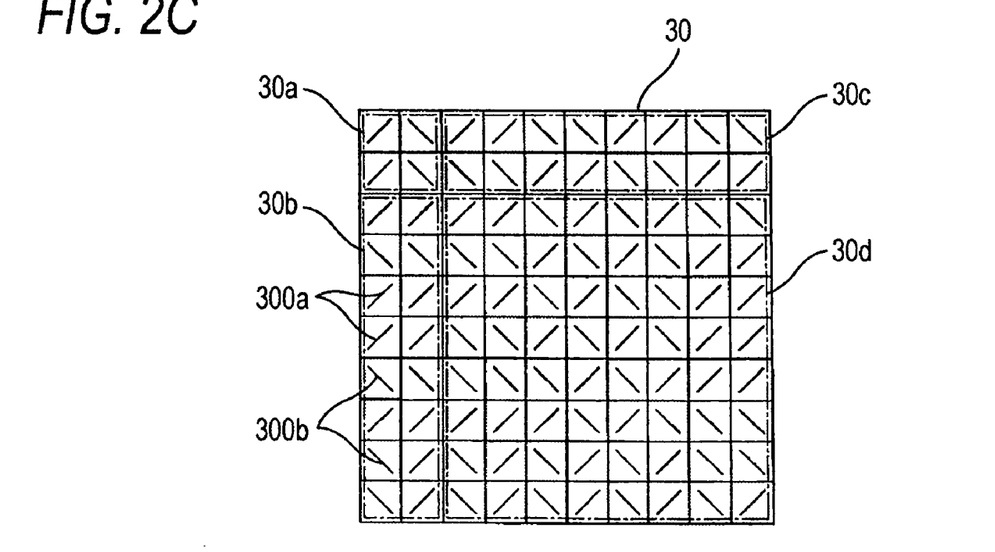
FIG. 2C is a drawing showing the detailed configuration of the code image.

FIGS. 2A to 2C show details of the code layer 21 of the handwriting detection sheet 2. For example, a large number of 2×2 mm code images 30 are arranged in a matrix manner over the whole code layer 21 of the handwriting detection sheet 2 as shown in FIGS. 2A and 2B.

The code images 30 are formed of an invisible color material for absorbing infrared light, for example, a transparent toner (far-red light absorbing polycarbonate resin manufactured by Sumitomo Dow Limited). However, the code images 30 may be formed of a visible light absorption material for absorbing infrared light, for example, a general ink material.

If an invisible light absorption material for absorbing infrared light is used, it can be prevented that the code image 30 makes it difficult to recognize characters, which are handwritten on the handwriting layer 20 with the electronic pen 4.

The code image 30 includes a rotation code part 30a provided in the upper left corner, an X coordinate code part 30b provided below the rotation code part 30a, a Y coordinate code part 30c provided on the right side of the rotation code part 30a, and an identification code part 30d provided below the lower right side of the rotation code part 30a.

Information indicating a direction in which the code image 30 exists is encoded in the rotation code part 30a. ˆX and Y coordinates of the code image 30 on the handwriting detection sheet 2 are encoded in the X coordinate code part 30b and the Y coordinate code part 30c. Identification information of the handwriting detection sheet 2 is encoded in the identification code part 30d. The same X coordinate is encoded in the X coordinate code parts 30b arranged in the longitudinal direction. Also, the same Y coordinate is encoded in the Y coordinate code parts 30c arranged in the lateral direction. The same code is encoded in the rotation code parts 30a. The same code is encoded in the identification code parts 30d independently of positions of the code images 30.

The identification information of the handwriting detection sheet 2 includes a size, a type of a document (such as business card, patient's chart or check), for example.

Each of the code parts 30a to 30d includes a combination of slanting line patterns 300a of slash "/" and slanting line patterns 300b of back slash "\", as shown in FIG. 2C. The slanting line patterns 300 (300a, 300b) are formed in 0.2 mm pitches, for example. One slanting line pattern 300a, 300b represents one-bit information (0 or 1).

The patterns in the code image 30 are not limited to the slanting line patterns 300a, 300b, but may be two-dimensional code such as known QR code, PDF417, Data Matrix, or Maxi Code or may be one-dimensional code such as bar code, unique code, or a dot pattern. Different types of codes may be used in combination in accordance with the purpose.

(Internal Structure of Electronic Pen)

Figure 3:
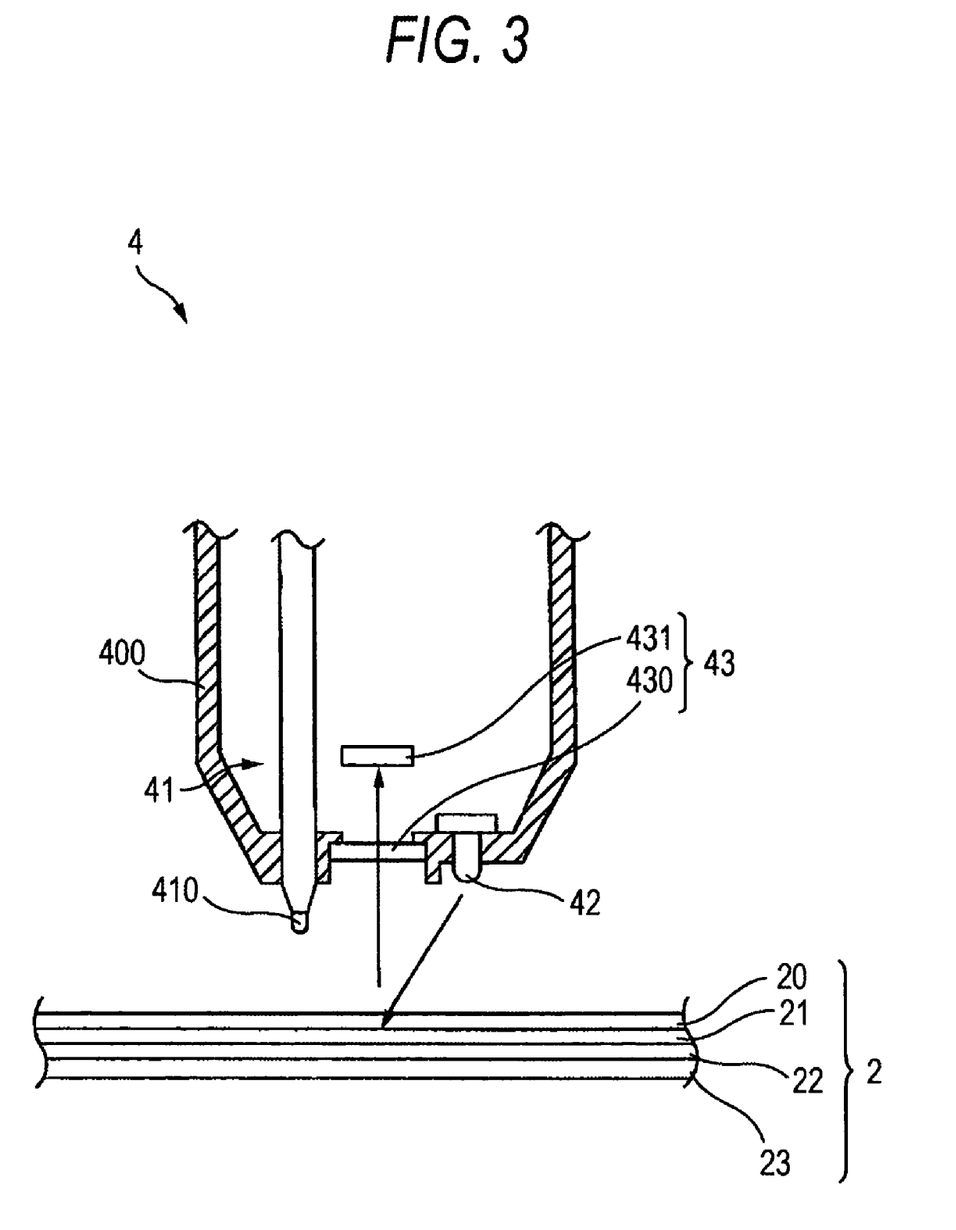
FIG. 3 is a sectional view showing the internal structure of an electronic pen according to the exemplary embodiment of the invention.

FIG. 3 is a sectional view showing the internal structure of the electronic pen 4. The electronic pen 4 has the pen-type casing body 400 and the pen part 41 as described above. Also, the electronic pen 4 includes an infrared LED (Light Emitting Diode) lamp 42, which serves as an infrared light source for applying infrared light to the handwriting detection sheet 2, and a capturing section 43 for capturing the code images 30 on the handwriting detection sheet 2. The pen part 41, the infrared LED lamp 42 and the capturing section 43 are housed in the casing body 400.

The infrared LED lamp 42 emits near-infrared light having a wavelength of 800 nm to 1000 nm. A laser or a halogen lamp may be used as the infrared LED lamp 42.

The capturing section 43 includes a visible light removal filter 430 and an infrared CCD (Charge Coupled Deice 431). The visible light removal filter 430 removes visible light from the infrared light, which is applied to the handwriting detection sheet 2 and reflected on the handwriting detection sheet 2, and allows the infrared light to pass through. The infrared CCD 431 serves as an image capturing device for capturing the infrared light passing through the visible light removal filter 430.

The infrared CCD 431 converts received light into an electric signal in accordance with the strength of the light. The infrared CCD 431 may have sensitivity from a visible region to a near-infrared region or may have sensitivity in a near-infrared region. CMOS (complementary metal oxide semiconductor) may be used as the image capturing device in place of the CCD 431.

Figure 4:
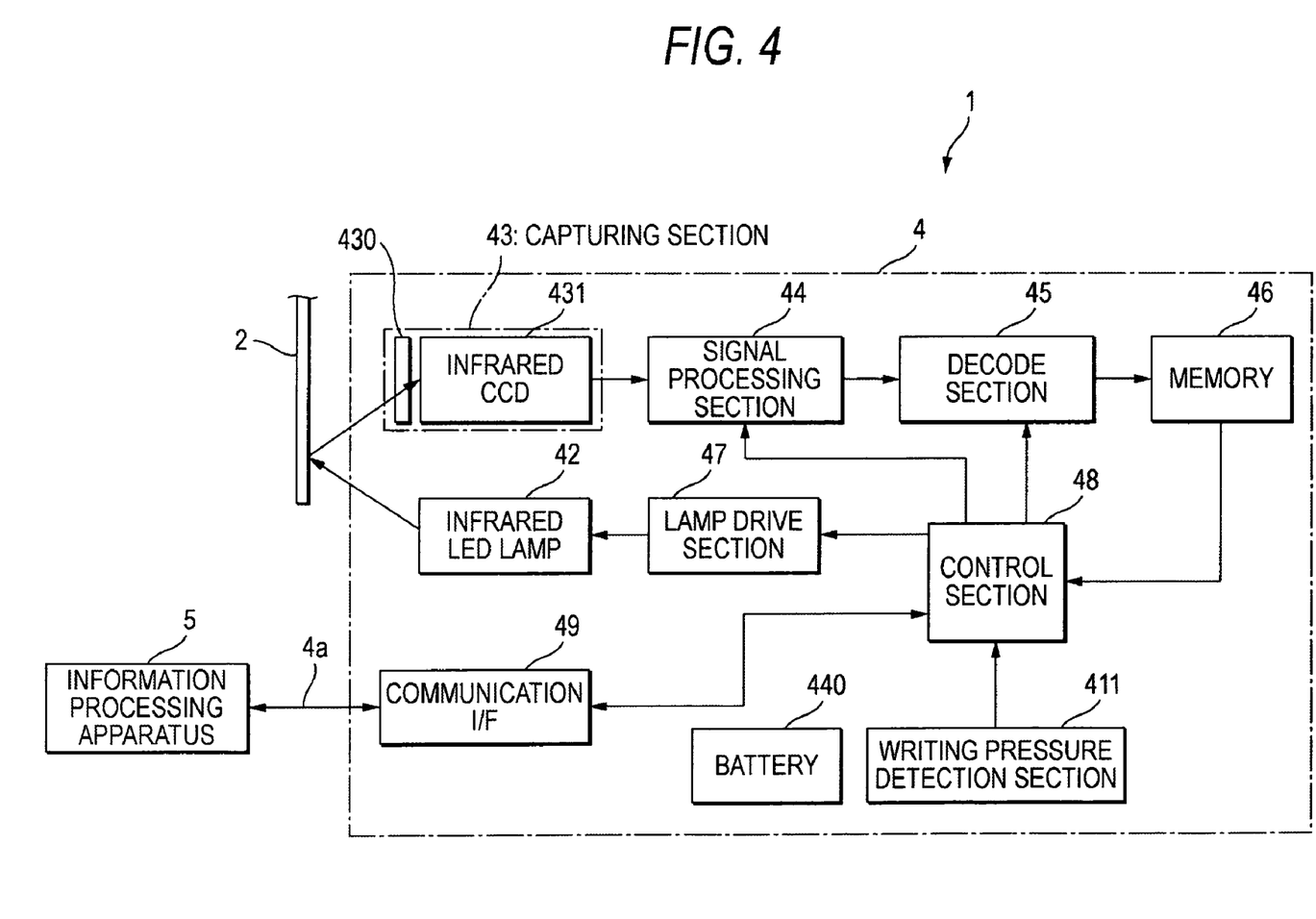
FIG. 4 is a block diagram of the electronic pen according to the exemplary embodiment of the invention.

FIG. 4 is a block diagram of the electronic pen 4. The electronic pen 4 includes a signal processing section 44 for processing the signal from the infrared CCD 431; a decode section 45 for decoding the signal processed by the signal processing section 44; a memory 46 for storing the code provided by the decode section 45; a lamp drive section 47 for driving the infrared LED lamp 42; a control section 48 for controlling the sections of the electronic pen 4; a communication interface (I/F) 49 for transmitting and receiving information to and from the information processing apparatus 5; and a battery 440, such as a nickel-cadmium battery or a lithium ion battery, for supplying power to the sections of the electronic pen 4, in addition to the infrared LED lamp 42, the infrared CCD 431, and the writing pressure detection section 411 as described above.

The writing pressure detection section 411, the signal processing section 44, the decode section 45, the memory 46, the lamp drive section 47, the control section 48, the communication I/F 49, and the battery 440 are housed in the casing body 400. Some or all of the handwriting calculation functions of the signal processing section 44, the decode section 45, and the control section 48 may be removed from the electronic pen 4 and included in the information processing apparatus 5 or another external system.

The signal processing section 44 converts an analog electric signal from the CCD 431 into a digital signal and performs various types of process such as inclination correction, gamma correction and noise removal.

When the writing pressure detection section 411 detects a given or more writing pressure, the control section 48 calculates locus of the pen point 410 from the X coordinate code and the Y coordinate code which indicate the coordinates of the pen point 410 and which are decoded by the decode section 45. Then, the control section 48 stores the locus in the memory 46 as handwrite data. When the communication I/F 49 is connected to the information processing apparatus 5, the control section 48 reads the handwrite data from the memory 46 and transmits the handwrite data to the information processing apparatus 5 through the communication I/F 49.

The lamp drive section 47 drives the infrared LED lamp 42 so as to generate infrared light continuously. When handwriting data is to be acquired (code is read), the lamp drive section 47 may cause the infrared LED lamp 42 to turn on instantaneously or in a pulse manner.

The decode section 45 reads a rotation code from the rotation code part 30a of the code images 30, an X coordinate code from the X coordinate code part 30b, an Y coordinate code from the Y coordinate code part 30c, and an identification code from the identification code part 30d, as described below with reference to FIG. 5.

Figure 5A:
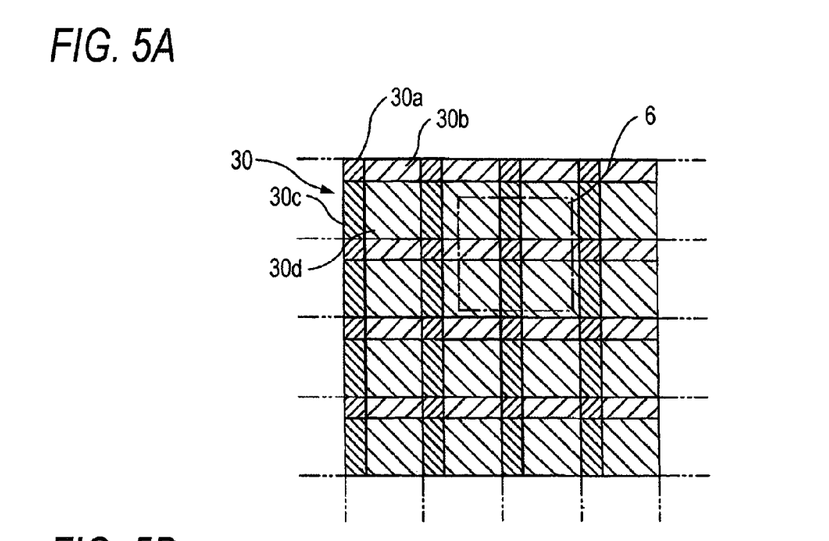
FIGS. 5A and 5B are drawings to describe code reading by a decode section according to the exemplary embodiment of the invention.
Figure 5B:
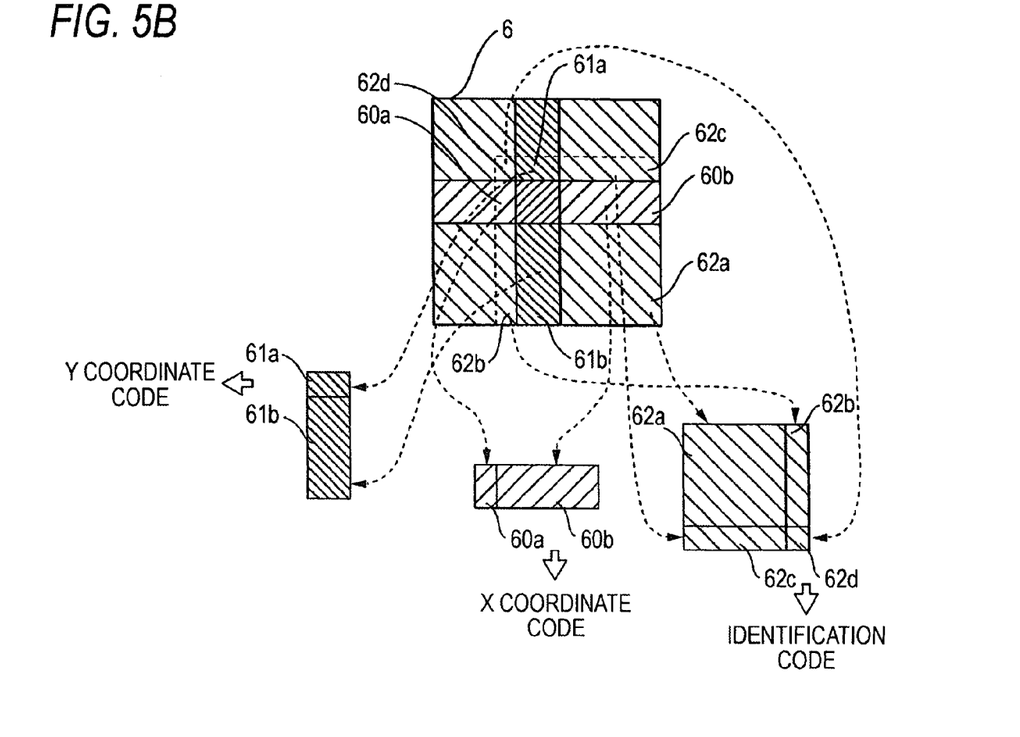

FIG. 5 is a drawing to describe code reading by the decode section 45. The code images 30 each including the rotation code part 30a, the X coordinate code part 30b, the Y coordinate code part 30c and the identification code part 30d are arranged two-dimensionally on the code layer 21 of the handwriting detection sheet 2 as shown in FIG. 5A. In FIG. 5A, the region surrounded by the alternate long and short dash line indicates an image 6 captured by the CCD 431, namely, a read area. FIG. 5B shows details of the captured image 6.

The image 6 captured by the CCD 431 is made larger than the code image 30. If the size of the code image 30 is 2 mm×2 mm as described above, the size of the captured image 6 is 3×3 mm, for example. The decode section 45 combines image parts 60a, 60b, 61a, 61b, 62a, 62b, 62c, and 62d of the captured image 6 to restore the X coordinate code, the Y coordinate code, and the identification code, as shown in FIG. 5B. Although the actual captured image 6 often is inclined with respect to the code image 30, the respective parts are combined in a similar manner to that shown in FIGS. 5A and 5B to thereby restore the codes.

(Operation of Handwriting System)

Next, the operation of the handwriting system 1 according to the exemplary embodiment will be discussed with reference to FIG. 6.

FIGS. 6A to 6D are sectional views of the handwriting detection sheet 2 to describe the operation of the handwriting system 1 according to the exemplary embodiment.

(1) Displaying Image by Means of Electronic Paper

Figure 6A:
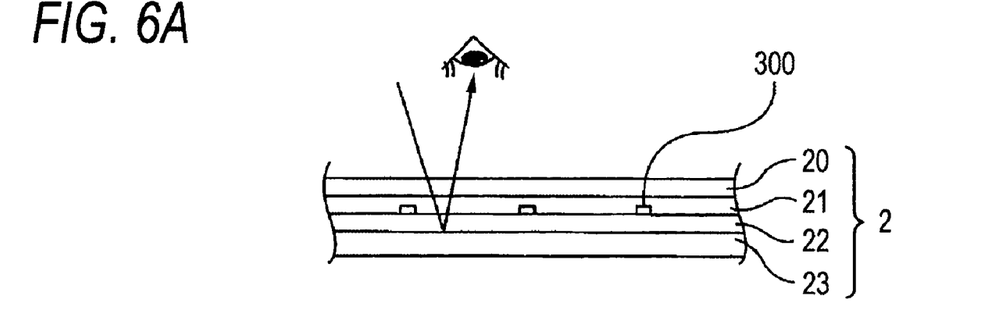
FIGS. 6A to 6D are sectional views of the handwriting detection sheet to describe an operation of the handwriting system according to the exemplary embodiment of the invention.

The CPU of the information processing apparatus 5 transmits a control signal to the printer 3 together with image data selected by a user who operates the input device from among plural pieces of image data stored in the storage section. The printer 3 applies a voltage between the pair of electrodes of the electronic paper 23 based on the image data and the control signal transmitted from the information processing apparatus 5 and applies image light to the electronic paper 23 in accordance with the image data so as to write an image onto the electronic paper 23.

As shown in FIG. 6A, the image written onto the electronic paper 23 can be observed from the front face of the handwriting detection sheet 2 because outside light passes through the handwriting layer 20, the code layer 21 and the optical layer 22 and is applied to the electronic paper 23 and its reflected light passes through the optical layer 22, the code layer 21, and the handwriting layer 20.

(2) Acquiring Handwriting Data

Figure 6B:
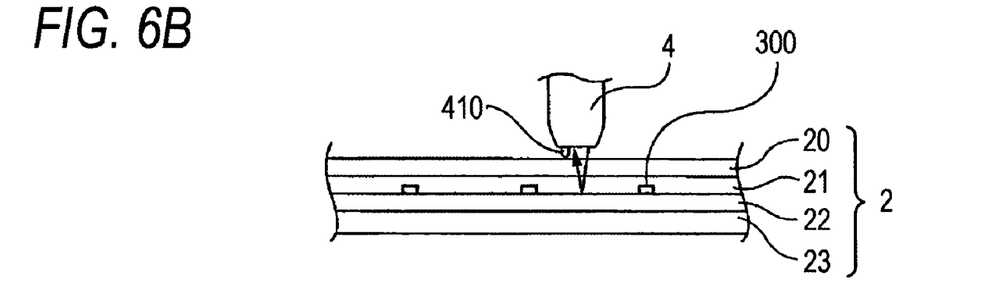
Figure 6C:
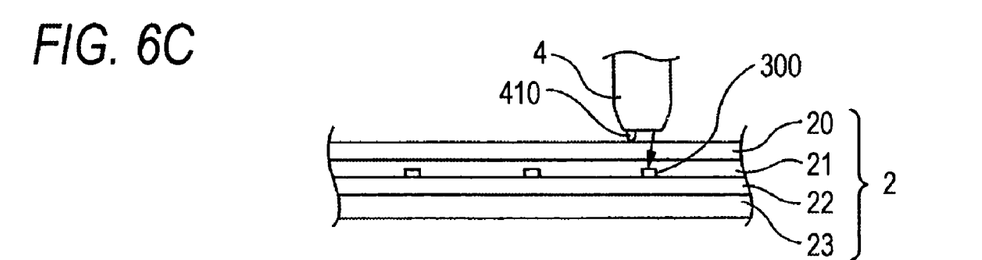

The infrared LED lamp 42 of the electronic pen 4 continuously generates infrared light while being driven by the lamp drive section 47. If the user handwrites an image and/or a character on the handwriting layer 20 of the handwriting detection sheet 2 with the pen point 410 of the electronic pen 4, the infrared light generated from the infrared LED lamp 42 passes through the handwriting layer 20 and is applied to the code layer 21. Of the infrared light applied to the code layer 21, the infrared light passing through any other portion than the slanting line pattern 300 is reflected on the optical layer 22 as shown in FIG. 6B. Also, the infrared light applied to the slanting line pattern 300 is absorbed by the slanting line pattern 300 as shown in FIG. 6C. The visible light removal filter 430 of the electronic pen 4A removes visible light from the infrared light reflected on the optical layer 22, and then the infrared light passing through the visible light removal filter 430 is incident on the infrared CCD 431. The infrared CCD 431 converts the incident infrared light into an electric signal.

The signal processing section 44 converts the analog electric signal input from the infrared CCD 431 into a digital signal and performs various types of processes such as the inclination correction, the gamma correction and the noise removal. The decode section 45 decodes the signal processed by the signal processing section 44 into a rotation code, an X coordinate code, a Y coordinate code, and an identification code. The image capturing by the infrared CCD 431, the signal processing by the signal processing section 44, and the decoding by the decode section 45 are executed in 60 to 100 cycles a second.

When the writing pressure detection section 411 detects a given or more writing pressure, the control section 48 calculates the locus of the pen point 410 based on the X coordinate code and the Y coordinate code, which indicate the coordinates of the pen point 410, of the codes acquired by the decode section 45. Then, the control section 48 stores the locus in the memory 46 as handwrite data.

Figure 6D:
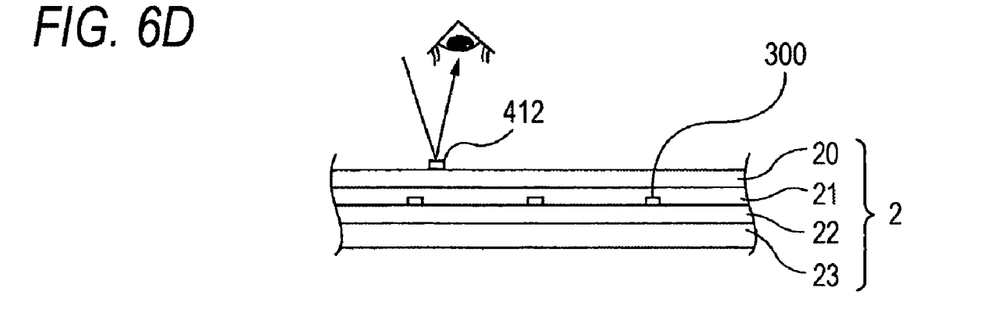

The ink 412 used for handwriting on the handwriting layer 20 with the pen point 410 of the electronic pen 4 can be visually recognized because visible light is reflected on the ink 412 as shown in FIG. 6D. The light reflected on the ink 412 is also incident on the infrared CCD 431, but is incident on the infrared CCD 431 after visible light is removed by the visible light removal filter 430. Therefore, an image of the slanting line patterns 300 can be captured clearly.

(3) Transferring Handwriting Data

If the user connects the electronic pen 4 to the information processing apparatus 5 by the cable 4a, the control section 48 of the electronic pen 4 reads the handwrite data from the memory 46 and transmits the read handwrite data to the information processing apparatus 5 through the communication I/F 49 and the cable 4a. The CPU of the information processing apparatus 5 stores the handwriting data transmitted from the electronic pen 4 in the storage section and also superposes the handwriting data on the image displayed on the electronic paper 23 (display image) to generate a synthesized image. Then, the CPU of the information processing apparatus 5 controls the printer 3 to write the synthesized image onto the electronic paper 23.

Even after the synthesized image is displayed on the electronic paper 23, the image before appended may be displayed on the electronic paper 23 according to a user's selection. The synthesized image may be displayed on the display section. Further, the synthesized image may be stored in the storage section together with the display image and the handwriting data or may be transferred through a network interface to a server for management.

The ink 412 used for handwriting on the handwriting layer 20 can be erased with the erasing member 420 attached to the electronic pen 4.

EXAMPLES

Next, specific composition examples of the layers of the handwriting detection sheet 2 will be discussed with reference to FIGS. 7A to 7E. FIGS. 7A to 7E show the stack orders in the manufacturing processes corresponding to examples 1 to 5 of the invention.

Example 1

Figure 7A:
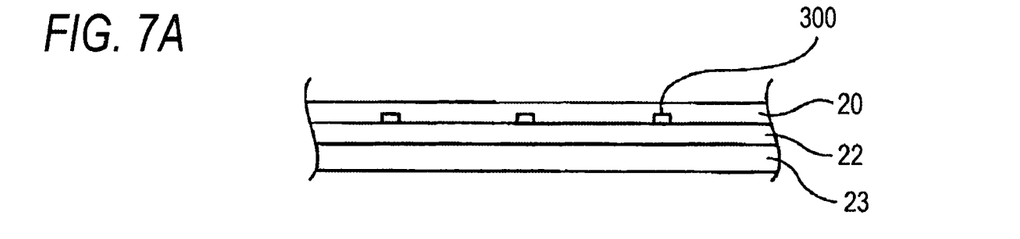
FIGS. 7A to 7E are sectional views showing the layer configuration of the handwriting detection sheets according to examples of 1 to 5 of the invention.

In the example 1 of the invention, an optical layer 22 is formed on an electronic paper 23. Then, slanting line patterns 300 are formed on the optical layer 22. A handwriting layer 20 is applied onto the optical layer 22 and the slanting line patterns 300, as shown in FIG. 7A.

The optical layer 22 may be a high-level interference multilayer film formed by coating plural layers of thin film, which reflect infrared light and which allow visible light to pass through, with HIR (Halogen lamp eith Infrared Reflective films) technique of Harrison Toshiba Lighting Company, for example. A stacked thin film having a sandwich structure of a titanium nitride (TiN) film having an infrared reflection characteristic and a titanium oxide ($TiO_2$) film to raise visible light transmittance ($TiO_2$/TiN/$TiO_2$) may be used. (For example, refer to JP 2005-3614 A).

Example 2

Figure 7B:
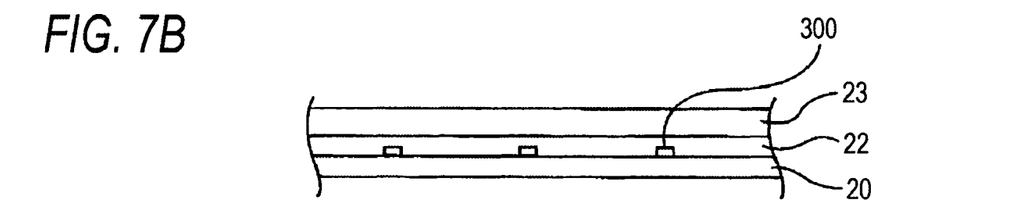

In the example 2 of the invention, the stack order in the example 1 is reversed. Slanting line patterns 300 are formed on a handwriting layer 20, an optical layer 22 is applied onto the handwriting layer 20 and the slanting line patterns 300, and electronic paper 23 is placed on the optical layer 22, as shown in FIG. 7B.

Example 3

Figure 7C:
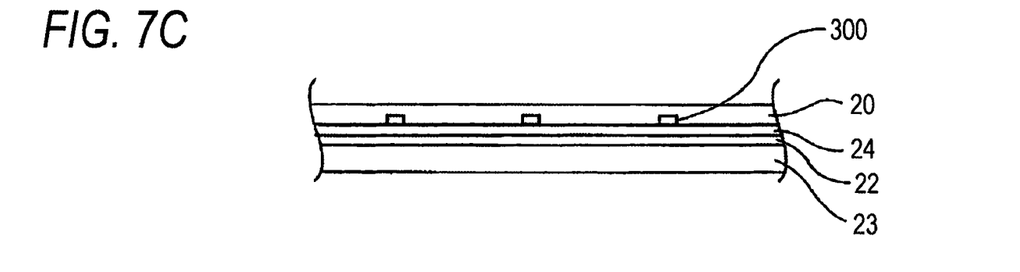

In the example 3 of the invention, an optical layer 22 is formed on an electronic paper 23, a substrate 24 is joined to an optical layer 22, slanting line patterns 300 are formed on the substrate 24, and a handwriting layer 20 is applied onto the substrate 24 and the slanting line patterns 300, as shown in FIG. 7C. This structure is suited to the case where it is hard to form the slanting line patterns 300 directly on the optical layer 22.

Example 4

Figure 7D:
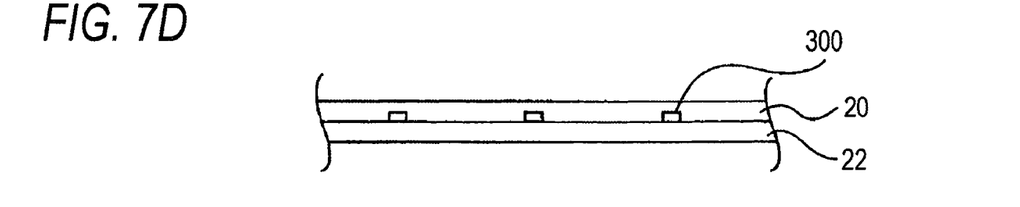

The example 4 of the invention is different from the example 1 in that an electronic paper 23 is not joined. Slanting line patterns 300 are formed on an optical layer 22 and a handwriting layer 20 is applied onto the optical layer 22 and the slanting line patterns 300, as shown in FIG. 7D. In the example 4, an electronic paper 23 is placed on the side of the optical layer 22 and is used.

Example 5

Figure 7E:
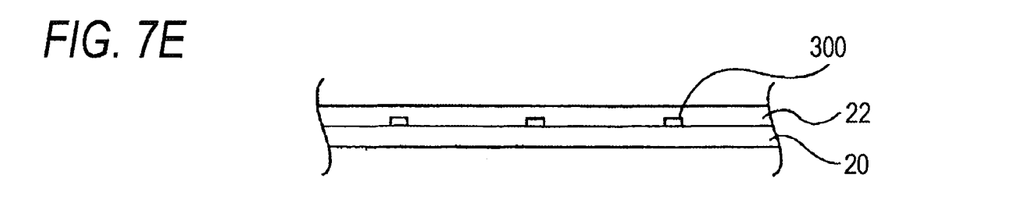

In the example 5 of the invention, the stack order in the example 4 is reversed. Slanting line patterns 300 are formed on a handwriting layer 20, an optical layer 22 is applied onto the handwriting layer 20, and the slanting line patterns 300, as shown in FIG. 7E. In the example 5, electronic paper 23 is placed on the side of the optical layer 22 and is used.

[Other Embodiments]

It is to be understood that the invention is not limited to the exemplary embodiment and the examples. Various modifications and changes may be made without departing from the spirit and the scope of the invention.

For example, recording media made of paper, plastic, cloth, etc., may be used in place of the electronic paper 23.

The case where the information reader for reading handwriting is applied to the pen is described in the exemplary embodiment, but it may be applied to a personal digital assistant (PDA), a mobile telephone, etc. In this case, the personal digital assistant, the mobile telephone, etc., may have no writing function.

Communications between the electronic pen 4 and the information processing apparatus 5 may be conducted by infrared communications. In this case, the information processing apparatus 5 may be provided with an infrared transmission-reception section and the electronic pen 4 may use an infrared LED lamp for image pickup or may be provided with an infrared LED lamp. Preferably, the electronic pen 4 includes a communication start button.

For example, the infrared communications can use four-valued PPM (pulse position modulation) based on IrDA (Infrared Data Association) standard, but the invention is not limited to it. The four-valued PPM is a system of emitting light for the one-slot time duration of four-slot time and transmitting two bits of "00," "01," "10," or "11."

FIG. 4

5 INFORMATION PROCESSING APPARATUS
42 INFRARED LED LAMP
43 CAPTURING SECTION
44 SIGNAL PROCESSING SECTION
45 DECODE SECTION
46 MEMORY

47 LAMP DRIVE SECTION
48 CONTROL SECTION
49 COMMUNICATION I/F
411 WRITING PRESSURE DETECTION SECTION
431 INFRARED CCD
440 BATTERY

What is claimed is:

1. A handwriting detection sheet comprising:
a handwriting layer on which a handwriting can be written that can display the handwriting;
a code layer, on which the handwriting cannot be written directly, placed on a rear-face side of the handwriting layer, the code layer comprising a plurality of code images arranged in a matrix manner, wherein the code images in which position codes are encoded are formed with a light absorption material that absorbs infrared light; and
an optical layer placed on a rear-face side of the code layer, the optical layer that reflects infrared light and allows visible light to pass through.

2. The sheet according to claim 1, further comprising:
an electronic paper that can rewrite content displayed thereon, the electronic paper placed on a rear-face side of the optical layer.

3. The sheet according to claim 1, wherein the light absorption material allows visible light to pass therethrough.

4. A handwriting system comprising:
the handwriting detection sheet according to claim 1; and
an electronic pen comprising:
  a pen point that can handwrite on the handwriting layer;
  an infrared light source that generates infrared light and applies the infrared light to the code layer of the handwriting detection sheet; and
  a capturing section that receives reflected light to capture the code images.

5. The system according to claim 4, further comprising:
a decode section that reads the position codes from the code images captured by the capturing section.

6. The system according to claim 5, further comprising:
a computation section that computes handwriting data including locus of the pen point, based on the position codes read by the decode section.

7. A handwriting system comprising:
the handwriting detection sheet according to claim 2;
an electronic pen comprising:
  a pen point that can handwrite on the handwriting layer;
  an infrared light source that generates infrared light and applies the infrared light to the code layer of the handwriting detection sheet; and
  a capturing section that receives reflected light to capture the code images;
a decode section that reads the position codes from the code images captured by the capturing section;
a computation section that computes handwriting data including locus of the pen point, based on the position codes read by the decode section; and
a control section that writes an image onto the electronic paper based on image data, and writes into the electronic paper a synthesized image obtained by synthesizing (i) the handwriting data provided by the computation section and (ii) the image written onto the electronic paper.

8. The sheet according to claim 1, wherein the code images are further encoded with an identification code that includes a size and a type of document.

9. A handwriting detection sheet comprising:
a handwriting layer on which a handwriting can be written that can display the handwriting;
a code layer placed on a rear-face side of the handwriting layer, the code layer comprising a plurality of code images arranged in a matrix manner, wherein the code images in which position codes are encoded are formed with a light absorption material that absorbs infrared light; and
an optical layer placed on a rear-face side of the code layer, the optical layer that reflects infrared light and allows visible light to pass through, wherein
the position codes have a rotation code part, a X-coordinate code part, and a Y-coordinate code part,
the rotation code part has a first side edge and a second side edge, and is located in a region defined by at least the first side edge and the second side edge, the first side edge being substantially perpendicular to the second side edge,
the X-coordinate code part has a third side edge and a fourth side edge, and is located in a region defined by at least the third side edge and the fourth side edge, the third side edge being substantially perpendicular to the fourth side edge, and the third side edge being adjacent to the first side edge of the rotation code part,
the Y-coordinate code part has a fifth side edge and a sixth side edge, and is located in a region defined by at least the fifth side edge and the sixth side edge, the fifth side edge being substantially perpendicular to the sixth side edge, and the fifth side edge being adjacent to the second side edge of the rotation code part.

10. The sheet according to claim 9, wherein
the position codes further include an identification code part having a seventh side edge and an eighth side edge, the identification code part being located in a region defined by at least the seventh side edge and the eighth side edge, and
the seventh side edge is substantially perpendicular to the eighth side edge, the seventh side edge being adjacent to the fourth side edge of the X-coordinate code part and eighth side edge being adjacent to the sixth side edge of the Y-coordinate code part.

11. The sheet according to claim 1, wherein the handwriting layer, the code layer and the optical layer are formed of a resin material.

12. The sheet according to claim 1, wherein the handwriting layer allows infrared light to pass through.

13. The sheet according to claim 1, wherein the handwriting layer allows visible light to pass through.

14. The sheet according to claim 1, wherein the handwriting layer allows infrared light and visible light to pass through.

15. The sheet according to claim 1, wherein, in the code layer, other portions than the code images allow infrared light to pass through.

16. The sheet according to claim 1, wherein, in the code layer, other portions than the code images allow visible light to pass through.

17. The sheet according to claim 1, wherein, in the code layer, other portions than the code images allow infrared light and visible light to pass through.

18. A handwriting detection sheet comprising:
a handwriting layer on which a handwriting can be written that can display the handwriting;
a code layer placed on a rear-face side of the handwriting layer, the code layer comprising a plurality of code images arranged in a matrix manner, wherein the code images in which position codes are encoded are formed with a light absorption material that absorbs infrared light; and an optical layer placed on a rear-face side of the code layer, the optical layer that reflects infrared light and allows visible light to pass through, wherein the handwriting layer serves as a protective layer for separating the handwriting and the code layer placed on the rear-face side of the handwriting layer.

19. The sheet according to claim 1, wherein besides the code images, other parts of the code layer are formed with material that allows infrared light to pass through.

20. The system according to claim 4, wherein the electronic pen further comprises a filter that removes visible light from the reflected light before the capturing section receives that reflected light, and the reflected light received by the capturing section is infrared light.

* * * * *